US009863298B2

(12) United States Patent
Silver et al.

(10) Patent No.: US 9,863,298 B2
(45) Date of Patent: Jan. 9, 2018

(54) COMPRESSION IGNITION ENGINE SYSTEM WITH IMPROVED REGENERATION VIA CONTROLLED ASH DEPOSITS

(71) Applicant: Caterpillar Inc., Peoria, IL (US)

(72) Inventors: Ronald Silver, Peoria, IL (US); Brandon Shull, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 489 days.

(21) Appl. No.: 14/531,404

(22) Filed: Nov. 3, 2014

(65) Prior Publication Data

US 2016/0123201 A1     May 5, 2016

(51) Int. Cl.
*F01N 3/02*  (2006.01)
*F01N 3/00*  (2006.01)
(Continued)

(52) U.S. Cl.
CPC ............ *F01N 3/035* (2013.01); *F01N 3/106* (2013.01); *F01N 9/002* (2013.01); *F02B 79/00* (2013.01); *F01N 3/208* (2013.01); *F01N 3/2066* (2013.01); *F01N 9/005* (2013.01); *F01N 13/009* (2014.06); *F01N 2260/04* (2013.01); *F01N 2370/04* (2013.01); *F01N 2550/04* (2013.01); *F01N 2560/026* (2013.01); *F01N 2560/06* (2013.01); *F01N 2610/02* (2013.01); *F01N 2900/0412* (2013.01); *F01N 2900/0416* (2013.01); *F01N 2900/1404* (2013.01); *F01N 2900/1602* (2013.01); *F01N 2900/1606* (2013.01); *Y02T 10/24* (2013.01); *Y02T 10/47* (2013.01)

(58) Field of Classification Search
CPC ........ F01N 3/021; F01N 3/023; F01N 3/0814; F01N 3/0232; F01N 3/208; F01N 3/035; F01N 3/106; F01N 3/2066; F01N 3/0821; F01N 3/0222; F01N 9/002; F01N 9/005; F01N 13/009; F01N 2260/04; F01N 2560/026; F01N 2560/06; F01N 2900/0412; F01N 2900/0416; F01N 2900/1404; F01N 2900/1602; F01N 2900/1606; F01N 2900/1611; F02B 79/00; Y02T 10/24; Y02T 10/47
USPC ........................... 60/286, 297, 301, 303, 311
See application file for complete search history.

(56) References Cited

U.S. PATENT DOCUMENTS 7,340,888 B2   3/2008   Zhang et al.
7,562,522 B2   7/2009   Yan
(Continued)

FOREIGN PATENT DOCUMENTS

EP       2491999 A1    8/2012

*Primary Examiner* — Phutthiwat Wongwian
*Assistant Examiner* — Diem Tran
(74) *Attorney, Agent, or Firm* — Baker Hostetler

(57) ABSTRACT

An engine system includes an electronically controlled compression ignition engine configured to burn diesel fuel and a high ash oil to produce an exhaust with a temperature and NOx to soot ratio as well as a controlled level of ash deposits on the particulate filter of the system. An aftertreatment system is fluidly connected to the engine and includes a diesel oxidation catalyst, a reductant supply, and a diesel particulate filter coated with a NOx reduction catalyst. The soot load density on the diesel particulate filter can be stabilized by oxidizing soot at about a same rate as the compression ignition engine is supplying soot to the aftertreatment system.

8 Claims, 4 Drawing Sheets

(51) Int. Cl.

| | | |
|---|---|---|
| *F01N 3/10* | (2006.01) | |
| *F01N 3/035* | (2006.01) | |
| *F02B 79/00* | (2006.01) | |
| *F01N 9/00* | (2006.01) | |
| F01N 3/20 | (2006.01) | |
| F01N 13/00 | (2010.01) | |

(56) References Cited

U.S. PATENT DOCUMENTS

| | | |
|---|---|---|
| 7,614,214 B2 | 11/2009 | Yan |
| 8,252,258 B2 | 8/2012 | Müller-Stach et al. |
| 2010/0101409 A1* | 4/2010 | Bromberg ............... F01N 3/025 95/8 |
| 2011/0047992 A1 | 3/2011 | Adelman et al. |
| 2011/0120088 A1* | 5/2011 | George ................... F01N 3/021 60/274 |
| 2012/0247085 A1 | 10/2012 | Silver et al. |

* cited by examiner

COMPRESSION IGNITION ENGINE SYSTEM WITH IMPROVED REGENERATION VIA CONTROLLED ASH DEPOSITS

TECHNICAL FIELD

The disclosure relates generally to a compression ignition engine coupled with an exhaust aftertreatment system, and more particularly to stabilizing a soot load density via controlled ash deposits on a diesel particulate filter of the exhaust aftertreatment system.

BACKGROUND

Conventionally, a diesel particulate filter must be periodically regenerated in order to reduce back pressure on the engine and/or to prevent a runaway exothermic soot oxidation reaction in a soot load trapped in the filter. Reducing back pressure on the engine is generally associated with more efficient operation, and hence an incremental reduction in fuel consumption by the engine. A runaway exothermic oxidation reaction is generally undesirable since temperatures can become briefly so high that the filter substrate (e.g., zeolite) may become cracked or otherwise damaged to the point that the filter may be compromised. Active regeneration of a diesel particulate filter refers to a process by which the accumulated soot in the diesel particulate filter is oxidized by increasing the temperature at the filter in order to encourage soot oxidation. The active regeneration process is sometimes carried out with fuel injected into an aftertreatment system upstream from the diesel particulate filter, or by the use of electrical heaters or the like. By initiating the regeneration process at a relatively low soot load density, the oxidation reaction can be controlled, and a runaway exothermic reaction, and the damage risks associated with such a reaction, can be avoided. However, there is often a tradeoff between the additional fuel consumption necessary to perform active regeneration of the diesel particulate filter verses the additional fuel needed by the engine to overcome back pressure associated with a soot accumulation on the diesel particulate filter.

In order to comply with the regulation of particulates and $NO_x$, some engine manufacturers have implemented a strategy called selective catalytic reduction (SCR) in an attempt to reduce the presence of NOx at the tailpipe. SCR is a process where a reductant, most commonly urea $((NH_2)_2CO)$, a water/urea solution or the like, is selectively injected into the exhaust gas stream of an engine and absorbed onto a downstream substrate. The injected urea solution decomposes into ammonia $(NH_3)$, which reacts with NO in the exhaust gas to form water $(H_2O)$ and diatomic nitrogen $(N_2)$. Engine manufacturers implementing the SCR process typically include the diesel oxidation catalyst upstream of the SCR substrate to assist in altering the composition of the exhaust gas stream before it passes to the SCR substrate. Such diesel oxidation catalysts typically include a porous substrate made from, coated with, or otherwise including a catalyzing material such as palladium, platinum, vanadium, and/or other precious metals. Such materials facilitate a conversion of NO to $NO_2$, thereby increasing the ratio of $NO_2$ to NO upstream of the SCR substrate. The elevated level of $NO_2$ provided by the oxidation catalyst may assist in both improving NOx conversion over the SCR catalyst and oxidizing soot particles that collect in a particulate filter.

Furthermore, conventional aftertreatment systems often contend with the presence of ash. In a given engine system, a complete seal between piston rings and engine cylinder wall may not be present. This allows some amount of engine oil to enter the combustion chamber causing the oil to burn. An ash residue remains and accumulates within the piston, ring grooves, and cylinder walls of the engine. Often this ash includes metallic elements and inorganic compounds originating from the additives present in the lubricating engine oil. Metal oxide particles are formed as a result of the combustion initiated oxidation of the metallic elements and inorganic compounds. These particles may then travel through the engine system into the aftertreatment system where they can collect on, and obstruct, the diesel particulate filter. These "ash" particles, however, are not susceptible to the filter regeneration process, as they are non-combustible. Conventionally, this ash layer is considered troublesome in that the ash blocks the filter, resulting in increased back pressure to the engine thereby increasing fuel consumption and decreasing power.

Although the conventional aftertreatment system structure has seen success and become somewhat widespread in use, there have been efforts to locate the NOx reduction reaction at the diesel particulate filter by coating the same with a NOx reduction catalyst. For instance, published U.S. Patent Application 2010/0058746 teaches a diesel particulate filter coated with both a diesel oxidation catalyst and a NOx reduction catalyst. However, this reference teaches a necessity of frequent active regeneration of the diesel particulate filter.

Certain strategies in aftertreatment methods, such as disclosed in published U.S. Patent Application 2012/0247085, have employed higher soot loading to optimize NOx reduction throughout the engine system. These systems however may not feature a diesel oxidation catalyst coated onto the diesel particulate filter. The lack of catalyst may ultimately result in an increase in the soot load density at which a runaway exothermic reaction soot oxidation can occur. The higher soot loading density has been found to deliver a reduced driving force on the nitrogen dioxide through a larger soot load layer, making the nitrogen and soot interaction time more similar to a conventional diesel particulate filter. Nevertheless, the higher soot loading on the particulate filter is still associated with the risk of runaway exothermic soot oxidation reactions, which can irrevocably damage the filter. These and other shortcomings of the prior art are addressed by the disclosure.

SUMMARY

The disclosure is directed to an aftertreatment strategy in conjunction with an engine system. In one aspect, a method of operating an engine system may include burning a high ash oil in a compression ignition engine to generate an ash deposit on a diesel particulate filter of an aftertreatment system fluidly connected to the compression ignition engine, burning a diesel fuel in the compression ignition engine to produce exhaust with a temperature and a NOx to soot ratio, wherein a soot load is disposed on at least a portion of the ash deposit, and stabilizing the soot load on at least the portion of the ash deposit by oxidizing soot at about a same rate as the compression ignition engine is supplying soot to the aftertreatment system.

In another aspect, an engine system may include an electronically controlled compression ignition engine configured to burn diesel fuel to produce an exhaust with a temperature and a NOx to soot ratio, the electronically controlled compression ignition engine further configured to burn a high ash oil to generate an ash deposit and an aftertreatment system fluidly connected to the engine, the aftertreatment system comprising a diesel oxidation catalyst and a diesel particulate filter, wherein the NOx to soot ratio and the temperature correspond to a stable soot load density on the diesel particulate filter, and wherein the ash deposit is interposed between the diesel particulate filter and the stable soot load.

In a further aspect, a method of operating an engine system may include catalyzing a reaction in exhaust of the engine system to combine nitrogen oxide with oxygen into nitrogen dioxide with a diesel oxidation catalyst of an aftertreatment system, forming a layer of ash on a diesel particulate filter within the aftertreatment system, and forming a stable soot load on the diesel particulate filter, wherein the layer of ash is interposed between the diesel particulate filter and the stable soot load.

DETAILED DESCRIPTION

Figure 1:
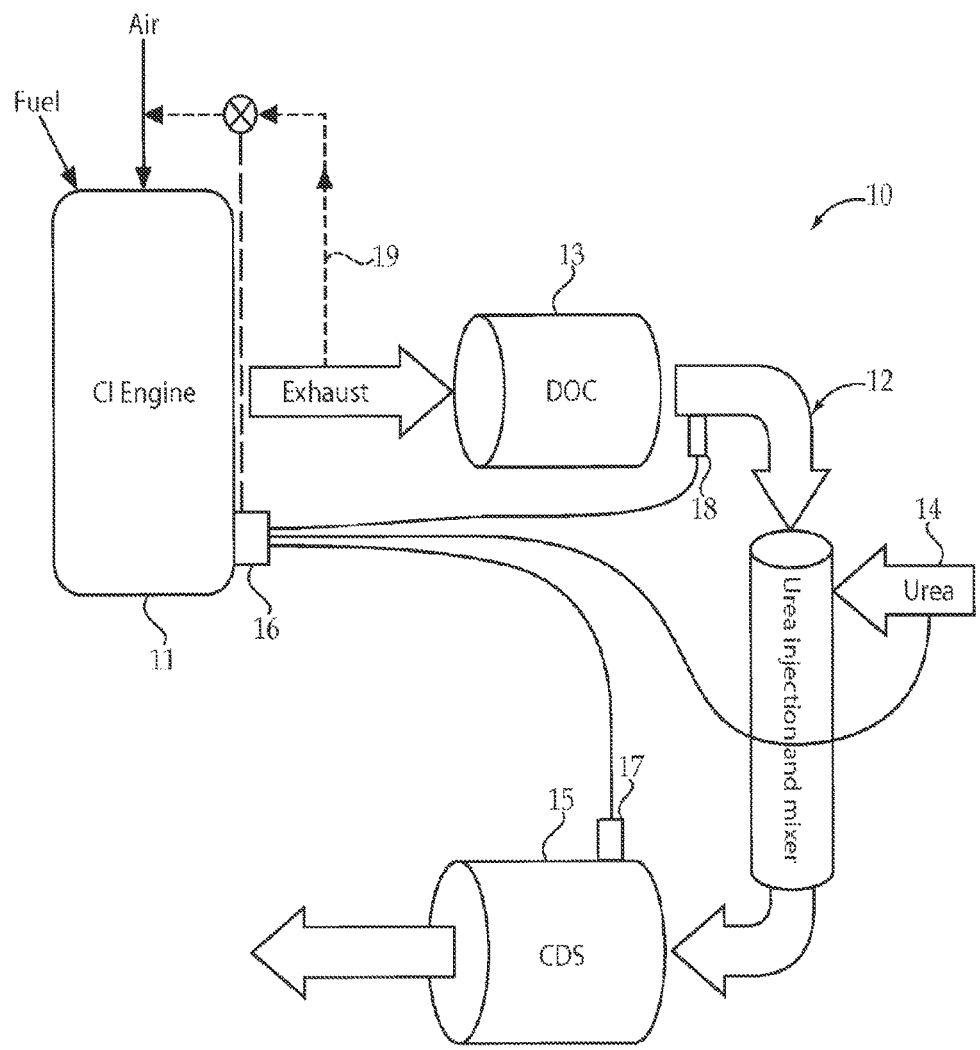
FIG. 1 is a schematic view of an engine system according to one aspect of the disclosure.

As shown in FIG. 1, an engine system 10 according to the disclosure may include an electronically controlled compression ignition engine 11 that may be configured to burn a high ash oil (e.g., CJ4 oil, oil with greater than 1.0% ash content, low ash oil including additives to produce ash, etc.) to produce a layer of ash deposit and to burn diesel fuel to produce an exhaust with a temperature and a NOx to soot ratio. An aftertreatment system 12 may be fluidly connected to engine 11. The aftertreatment system 12 may include a diesel oxidation catalyst 13, a reductant (e.g., urea, diesel exhaust fluid, or the like) supply 14, and a diesel particulate filter 15. The diesel particulate filter 15 may be coated with a NOx reduction catalyst and may be referred to a CDS system or filter. The term "CDS" refers to a shorthand version of a combined diesel particulate filter coated with a selective catalytic reduction (SCR) component.

An electronic controller 16 may be in control communication with engine 11. The electronic controller 16 may include an aftertreatment stabilization algorithm configured to estimate one or more of an ash load and a soot load density in the diesel particulate filter 15, and may be configured to adjust engine operation to stabilize one or more of the ash load and the soot load density. The engine system 10 may include an exhaust gas recirculation system 19 that may include a control valve that is controlled by the electronic controller 16 to adjust the amount, if any, of exhaust gas recirculated to the engine 11. The electronic controller 16 may be configured to control the engine 11 to allow a burning of a high ash oil to generate an ash deposit. As an example, a high ash oil can be used in the engine 11, wherein at least a portion of the high ash oil may pass into a combustion chamber of the engine 11. When the high ash oil combusts, the exhaust of the combustion chamber may include a particulate ash. The particulate ash in the exhaust may collect on a portion of the aftertreatment system 12 such as the diesel particulate filter 15. A control of the burning of the high ash oil may result in a control of a thickness of an ash deposited on the diesel particulate filter 15. As another example, burning a high ash oil in the engine 11 for a pre-determined period of time or usage (e.g., a break-in period, about 1000 miles of operation, about 100 hours of operation, etc.) may allow an ash deposit to form on the diesel particulate filter 15 having a controlled thickness, density, and the like. As a further example, the ash deposit may be controlled to provide at least a monolayer of ash covering the entire catalyst surface. A thickness of the ash deposit may be controlled to be from about 0.5 microns to about 2 microns. However, other thicknesses can be used. The electronic controller 16 may be configured to control the engine 11 such that the NOx to soot ratio in the exhaust and the temperature of the exhaust correspond to a stable soot load density in the diesel particulate filter 15 without active regeneration. A stable soot load density in the context of the disclosure means a soot load density that does not continue to grow until becoming plugged, but instead arrives at a steady state soot load density.

Although, the electronic controller 16 may be set to control an engine operating condition corresponding to a NOx to soot ratio and an exhaust temperature that produces a stable soot load density at the diesel particulate filter 15 without feedback control, the disclosure also contemplates a feedback strategy by which the electronic controller 16 estimates a temperature at the diesel particulate filter 15 and/or an engine out NOx to soot ratio and/or the soot load density in the diesel particulate filter 15 using any appropriate means known in the art. In this regard, regardless of whether the engine system 10 operates open loop or closed loop, the engine system 10 may include a temperature sensor 17 positioned in the aftertreatment system 12 in communication with the electronic controller 16. The aftertreatment stabilization algorithm of the electronic controller 16 may include a filter temperature estimation algorithm for estimating a temperature at the diesel particulate filter 15 using a temperature from the temperature sensor 17. Although the temperature sensor 17 in the illustrated aspect is located at the diesel particulate filter 15, those skilled in the art will appreciate that the temperature sensor(s) could be located elsewhere in the aftertreatment system 12 without departing from the disclosure. In such a case, a temperature at the diesel particulate filter 15 may be estimated utilizing predetermined correlations between the temperature sensed elsewhere in the aftertreatment system 12 and the corresponding temperature at the diesel particulate filter 15.

In addition to the temperature sensor 17, the aftertreatment system 12 may include a NOx sensor 18 positioned in the aftertreatment system 12 in communication with the electronic controller 16. The aftertreatment stabilization algorithm of the electronic controller 16 may include a NOx to soot estimation algorithm for estimating a NOx to soot ratio of exhaust at the diesel particulate filter 15. Estimating soot out from the engine 11 is known in the art, and need not be taught here. Those skilled in the art will appreciate that the NOx sensor 18 may be located at any suitable location in the aftertreatment system 12 and utilize correlations and other tools for estimating a NOx to soot ratio elsewhere in the aftertreatment system 12. The electronic controller 16 may include any known sensors, predetermined data and known techniques for estimating the NOx to soot ratio at any location in the aftertreatment system 12, including the diesel particulate filter 15.

In an aspect, the engine system 10 may include the electronic controller 16 controlling the mass flow rate of reductant (e.g. urea, diesel exhaust fluid, or the like) injection into the aftertreatment system 12 to provide a balanced NOx reduction reaction at the NOx reduction catalyst in the diesel particulate filter 15. Thus, the electronic controller 16 may include a suitable reductant injection control algorithm that utilizes known techniques for minimizing and/or avoiding either NOx slip or ammonia slip events at a tailpipe downstream from the diesel particulate filter 15.

In an aspect, the diesel particulate filter 15 may be of any suitable construction, such as a zeolite wall flow structure of a type well known in the art. Other suitable substrates may include, but are not limited to, vanadia or titania. The inlet and/or the outlet side of the diesel particulate filter walls may be coated with any suitable NOx reduction catalyst, such as copper. Other suitable catalysts may include, but are not limited to, iron or mixed metal oxides. In order to provide a system capable of operating in a stable soot load density regime according to the disclosure, the diesel particulate filter 15 may require a volumetric space velocity less than 70,000/hr which corresponds to exhaust flow at a rated condition divided by the volume of the filter. In general, this limitation corresponds to a larger volume SCR catalyst than an otherwise equivalent engine system according to prior art aftertreatment system designs.

In the past, the conventional wisdom in dealing with emission regulations has generally been to seek strategies for engine operation that produce lower quantities of ash and then rely upon an ash removal process to maintain the effectiveness of an aftertreatment system. The disclosure, instead, optimizes the engine system 10 by incorporating an intermediate deposit of ash between the diesel particulate filter 15 and the soot load.

Figure 2:
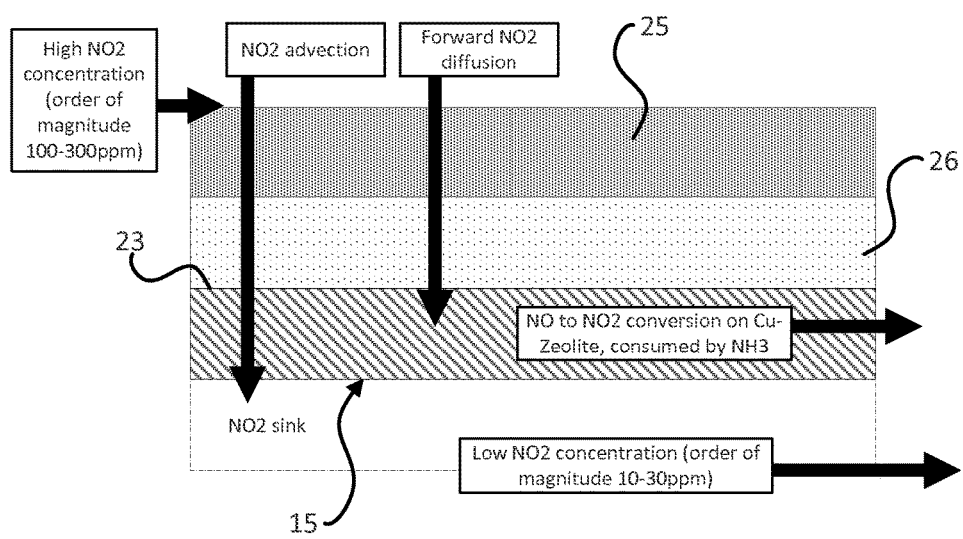
FIG. 2 is a partial sectioned pictorial view of a diesel particulate filter with stable soot load and low soot load incorporating an intermediate ash layer, respectively, according to one aspect of the disclosure.

FIG. 2 provides that a high ash oil may be burned in the engine system 10 to generate an intermediate layer of ash on the diesel particulate filter 15. As noted above, maintaining the ash layer 26 may be counterintuitive to the prevailing conventional wisdom. The soot load 25 and interposed ash layer 26 according to the disclosure, however, are favorable as the soot densities may be less than those associated with the runaway exothermic soot oxidation reaction in the diesel particulate filter 15.

In an aspect, a stable soot load density can be achieved in the diesel particulate filter 15. As an example, the diesel particulate filter 15 may be located at a location in the aftertreatment system 12 corresponding to temperatures generally in excess of 180° C. Stable soot load densities are generally not available when exhaust temperature at the diesel particulate filter 15 are lower than 180° C. There is no real upper limit of temperature at which a stable soot load density can be achieved. However, as temperatures at the diesel particulate filter begin to exceed temperatures on the order of about 450° C., the efficiency of the NOx reduction reaction can be undermined. But an elevated temperature NOx reduction reaction can be remedied, to some extent, by increasing a supply of reductant into the aftertreatment system 12. Thus, a system according to an aspect of the disclosure may be operated so that the temperature at the diesel particulate filter 15 is as hot as possible without undermining the NOx reduction reaction. For instance, a system that predominantly operates in a range where the temperature at the diesel particulate filter 15 is in a range of from 180° C. to 400° C. might be desirable.

Referring to FIG. 2, the illustrations show schematically how the diesel particulate filter of the disclosure, and its associated soot load 25, and ash layer 26 (e.g., deposit of ash particulate) affect the interaction between NOx and the soot load 25, and the NOx reduction reaction taking place at the NOx reduction catalyst coating 23. When a particulate filter 15 has a relatively low soot load, there is an increased driving force on nitrogen dioxide through the soot load 25, which reduces the nitrogen dioxide and soot interaction time. On the other hand, interposing the ash layer 26 between the soot load and the diesel particulate filter 15 delivers a lesser driving force on the nitrogen dioxide through the soot load 25, making the nitrogen dioxide and soot interaction time more similar to a conventional diesel particulate filter according to the prior art. The more interaction time available between nitrogen dioxide and the soot load 25, results in a faster reaction rate of the soot being oxidized by the nitrogen dioxide, which combined with the rate of soot introduction from the engine results in a stable soot load density. In another aspect, the rate of soot oxidation can be made equal to the rate of soot capture on the filter for a net soot accumulation rate of zero; $NO_2$ is converted to NO when the soot is oxidized with $NO_2$. While one could expect to expend more fuel to overcome the back pressure created by a higher soot load density according to the disclosure relative to the conventional wisdom of the prior art, this incremental increase in fuel consumption is more than made up for by the improved efficiency associated with higher $NO_x$ production and the absence of fuel consumption to initiate and carry out active regeneration as in the prior art. As shown in FIG. 2, the disclosure however presents an alternative design that may avoid the shortcomings of a higher density soot layer (e.g., soot load 25), without foregoing the improved efficiency and stability of the engine system achieved by higher soot loading.

In an aspect, the disclosure provides that by carefully specifying exhaust contents (e.g., ash, NOx: soot ratio, etc.) as a result of combustion characteristics (such as those proceeding from the ignition of high ash oil and the ignition of fuel) and/or further carefully specifying exhaust conditions (temperature) at the diesel particulate filter 15, it is possible to have soot regeneration occur passively at an acceptable rate without risking a runaway exothermic soot oxidation reaction, without excessive back pressure on the engine, and without the performance costs associated with the actively regenerated systems of the prior art. As an example, by configuring and controlling the engine system 10, one can stabilize a soot load in the diesel particulate filter 15 of the aftertreatment system 12 by oxidizing soot at about a same rate as the compression ignition engine is supplying soot to the aftertreatment system 12, while also catalyzing a NOx reduction reaction with a NOx reduction catalyst coated on the diesel particulate filter 15, where a layer of ash separates the soot and the NOx reduction catalyst. The phrase "at about a same rate" means that with time the two rates will asymptotically become equal if all other conditions remain constant. In an aspect, the ash layer 26 may mask the catalyst coating 23 and form a diffusion barrier. As an example, the ash layer 26 may decrease catalyst activity by decreasing the gas diffusion ability and reduce the rate of reactants reaching the catalyst coating 23. As another example, the ash layer may maintain the activation energy.

INDUSTRIAL APPLICABILITY

The disclosure is generally applicable to compression ignition engines that burn diesel fuel to produce an exhaust with a temperature and a NOx to soot ratio. The disclosure finds particular application to engine systems with a diesel particulate filter coated with a NOx reduction catalyst, where a layer of ash may be deposited between amassed soot and the NOx reduction catalyst, and that can be positioned in the aftertreatment system at a location that exhibits a minimum temperature on the order of about 180° C. most of the time. In addition, the disclosure is generally applicable to engine systems in which the diesel particulate filter 15 has a volumetric space velocity less than about 70,000/hr. In addition, the disclosure is generally applicable to engines capable of producing a NOx to soot ratio in a range between 20 to 1 up to 330 to 1.

Figure 3:
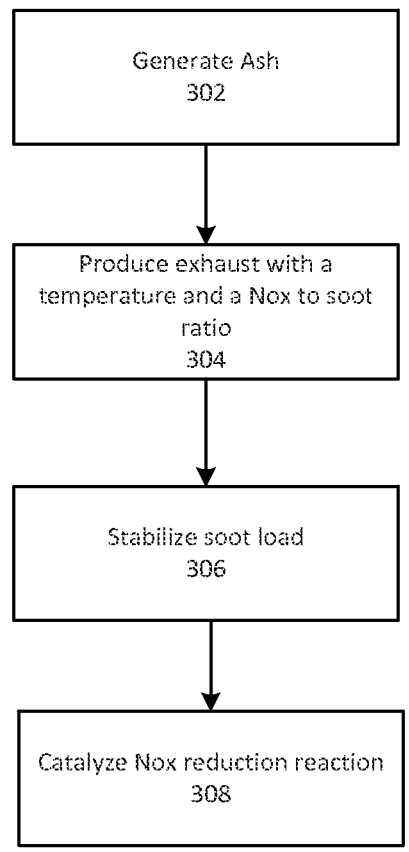
FIG. 3 is a flow diagram of an exemplary method of operation of an engine system according to one aspect of the disclosure.

Referring to FIG. 3, an exemplary method of operating an engine system (e.g., engine system 10) is provided. It may be appreciated that there are aspects that do not implement all of the operating procedures depicted in FIG. 3, or implement the depicted operating procedures in a different order than is depicted.

At step 302, engine oil (e.g., high ash oil) can be burned in a compression ignition engine (e.g., engine 11) to generate ash particulates in an exhaust. As an example, the ash particulates may be deposit on the diesel particulate filter 15 of the aftertreatment system 12 fluidly connected to the engine 11. A control of the burning of the engine oil may result in a control of a thickness of an ash deposit, for example, collected on the diesel particulate filter 15. As an example, oil can be injected into the manifold, such as at a hot test. As another example, burning a high ash oil in the engine 11 for a pre-determined period of time or usage (e.g., a break-in period, about 1000 miles of operation, about 100 hours of operation, about 500 hours of operation, etc.) may allow an ash deposit to form on the diesel particulate filter 15 having a controlled thickness, density, and the like. As a further example, the ash deposit may be controlled to provide at least a monolayer of ash covering the entire catalyst surface (e.g., NOx reduction catalyst coated on the diesel particulate filter). In an aspect, the diesel particulate filter may comprise one or more inlet channels and the ash deposit may be distributed (e.g., substantially evenly) along at least a portion of the length of each the inlet channel as a non-plugging layer. Measures may be taken to minimize an ash plug at a downstream end of the inlet channels. A thickness of the ash deposit may be controlled to be from about 0.5 microns to about 2 microns. However, other thicknesses can be used. In an aspect, the ash deposit includes a minimal amount of soot. The ash deposit may include small particulates (e.g., less than 40 microns) and may contain Mg and/or Zn. After the break-in period, for example, conventional low ash (non-high ash oil) can be burned with the diesel fuel.

In an aspect, at step 304, a diesel fuel can be burned in the compression ignition engine to produce exhaust with a temperature and a NOx to soot ratio. As an example, a soot load (e.g., soot load 25 (FIG. 2), a soot cake, etc.) is disposed on at least a portion of the ash deposit. As a further example, at least a portion of the ash deposit is interposed between a portion of the diesel particulate filter and the soot load.

At step 306, the soot load on at least the portion of the ash deposit may be stabilized. As an example, the soot load may be stabilized by oxidizing soot at about a same rate as the compression ignition engine is supplying soot to the aftertreatment system. As another example, the soot load may be stabilized by changing from a first engine operating condition to a second engine operating condition responsive to one or more of a temperature and a NOx to soot ratio of the exhaust at the diesel particulate filter. The changing from the first engine operating condition to the second engine operating condition may include changing from a first exhaust temperature to a second exhaust temperature, for example, in a temperature range corresponding to a temperature at the diesel particulate filter between 180 and 400 degrees C.

In an aspect, when the engine system 10 is in operation, exhaust is produced with a temperature and a NOx to soot ratio by burning diesel fuel in the compression ignition engine 11 that is operating according to an engine calibration. The soot load density is stabilized in the diesel particulate filter 15 of the aftertreatment system 12 by oxidizing soot in a reaction at about a same rate as the compression ignition engine 11 is supplying soot to the aftertreatment system 12. Apart from achieving a stable soot load density, a NOx reduction reaction may catalyzed with a NOx reduction catalyst coated on the diesel particulate filter 15, at step 308. Upstream from the diesel particulate filter 15, a reaction in the exhaust to combine nitrogen oxide with oxygen into nitrogen dioxide is accomplished with the help of a diesel oxidation catalyst 13. The NOx reduction reaction is facilitated by supplying a reductant, such as urea into the exhaust in the aftertreatment system 12 upstream from the diesel particulate filter 15.

The electronic controller 16 may make continuous or discrete estimates of the temperature at the diesel particulate filter 15 and the NOx to soot ratio of the exhaust in order to determine what the stable soot load density corresponds to under those conditions. In the event that the engine system 10 is being controlled to some target soot load density, the engine may change from a first engine operation condition to a second engine operation condition responsive to the estimated temperature and NOx to soot ratio in order to move to some target soot load density balance point, such as a soot load can range from about 0.3 to about 4 g soot/L of filter. On the other hand, the stabilized soot load density may change responsive to a change in engine operating conditions, such as by an operator changing a speed and load demand on engine 11 for whatever reason.

Figure 4:
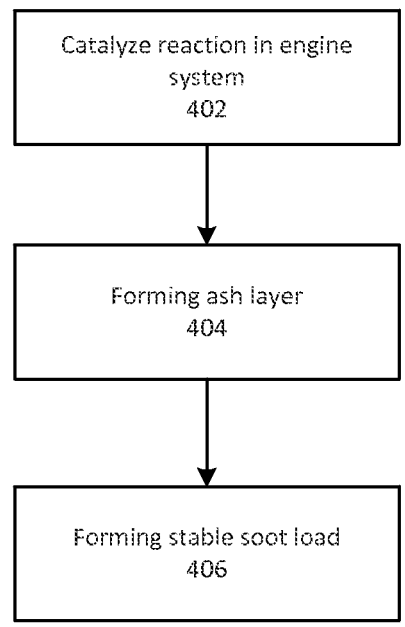
FIG. 4 is a flow diagram of an exemplary method of operation of an engine system according to one aspect of the disclosure.

Referring to FIG. 4, an exemplary method of operating an engine system (e.g., engine system 10) is provided. It may be appreciated that there are aspects that do not implement all of the operating procedures depicted in FIG. 4, or implement the depicted operating procedures in a different order than is depicted.

At step 402, a reaction in exhaust of the engine system may be catalyzed to combine nitrogen oxide with oxygen into nitrogen dioxide with a diesel oxidation catalyst of an aftertreatment system. As an example, the diesel particulate filter 15 may coated with a diesel oxidation catalyst that serves to catalyze a reaction between nitrogen oxides (NOx) in the exhaust with available oxygen to produce nitrogen dioxide.

At step 404, a layer of ash may be formed on a particulate filter (e.g., the diesel particulate filter 15) within an aftertreatment system. The ash layer may be substantially evenly distributed on the wall of the particulate filter (e.g., inlet, inlet channel, NOx reduction coated side, etc.). In an aspect, engine oil (e.g., high ash oil) can be burned in a compression ignition engine (e.g., engine 11) to generate ash particulates in an exhaust. As an example, the ash particulates may be deposited on the diesel particulate filter 15 of the aftertreatment system 12 fluidly connected to the engine 11. The ash deposit may form a membrane along a surface of the diesel particulate filter. A control of the burning of the engine oil may result in a control of a thickness of an ash deposit, for example, collected on the diesel particulate filter 15. As another example, burning a high ash oil in the engine 11 for a pre-determined period of time or usage (e.g., a break-in period, about 1000 miles of operation, about 100 hours of operation, about 500 hours of initial operation, until a first oil change, etc.) may allow an ash deposit to form on the diesel particulate filter 15 having a controlled thickness, density, and the like. As a further example, the ash deposit may be controlled to provide at least a monolayer of ash covering the entire catalyst surface. A thickness of the ash deposit may be controlled to be from about 0.5 microns to about 2 microns. However, other thicknesses can be used.

At step 406, a stable soot load can be formed on the diesel particulate filter 15. As an example, the layer of ash may be interposed between the diesel particulate filter and the stable soot load. The soot load may be stabilized by oxidizing soot at about a same rate as the compression ignition engine is supplying soot to the aftertreatment system. As another example, the soot load may be stabilized by changing from a first engine operating condition to a second engine operating condition responsive to one or more of a temperature and a NOx to soot ratio of the exhaust at the diesel particulate filter. The changing from the first engine operating condition to the second engine operating condition includes changing from a first exhaust temperature to a second exhaust temperature, for example, in a temperature range corresponding to a temperature at the diesel particulate filter between 180 and 400 degrees C. In another aspect, after a set period of time or duration of operation (e.g., first oil change), the ash layer may be satisfactorily formed. As such, a low ash oil (e.g., non-high ash oil) may be used for the rest of the life of the aftertreatment system. However, if the aftertreatment system undergoes an ash cleaning service, the initial process should be repeated with the high ash oil to reform the proper ash layer.

It should be understood that the above description is intended for illustrative purposes only, and is not intended to limit the scope of the disclosure in any way. Thus, those skilled in the art will appreciate that other aspects of the disclosure can be obtained from a study of the drawings, the disclosure and the appended claims.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:
1. A method of operating an engine system comprising:
burning a high ash oil in a compression ignition engine, during a break-in period, to generate an ash deposit on a diesel particulate filter of an aftertreatment system fluidly connected to the compression ignition engine;
burning a diesel fuel and a low ash oil in the compression ignition engine, after the break-in period, to produce exhaust with a temperature and a NOx to soot ratio, wherein a soot load is disposed on at least a portion of the ash deposit;
catalyzing a NOx reduction reaction with a NOx reduction catalyst coated on the diesel particulate filter; and
stabilizing the soot load on at least the portion of the ash deposit by oxidizing soot at a same rate as the compression ignition engine is supplying soot to the aftertreatment system.
2. The method of claim 1, wherein the break-in period comprises an initial 100 hours of engine operation, an initial 500 hours of engine operation, an engine operation until a first oil change.
3. The method of claim 1, further comprising:
catalyzing a reaction in the exhaust to combine nitrogen oxide with oxygen into nitrogen dioxide with a diesel oxidation catalyst of the aftertreatment system upstream from the diesel particulate filter; and
supplying a reductant into the exhaust in the aftertreatment system upstream from the diesel particulate filter.
4. The method of claim 3, wherein the reductant comprises urea.
5. The method of claim 1, wherein at least the portion of the ash deposit is interposed between a portion of the diesel particulate filter and the soot load.
6. The method of claim 1, wherein the stabilizing the soot load comprises changing from a first engine operating condition to a second engine operating condition responsive to one or more of a temperature and a NOx to soot ratio of the exhaust at the diesel particulate filter.
7. The method of claim 6, wherein the changing from the first engine operating condition to the second engine operating condition comprises changing from a first exhaust temperature to a second exhaust temperature.
8. The method of claim 7, wherein the changing from the first exhaust temperature to the second exhaust temperature is performed in a temperature range corresponding to a temperature at the diesel particulate filter between 180 and 400 degrees C.

* * * * *